(12) United States Patent
Storm et al.

(10) Patent No.: US 11,009,380 B2
(45) Date of Patent: May 18, 2021

(54) METHOD FOR DETERMINING THE GAS PORTION IN THE MEDIUM FLOWING THROUGH A CORIOLIS MASS FLOWMETER

(71) Applicant: KROHNE Messtechnik GmbH, Duisburg (DE)

(72) Inventors: Ralf Storm, Essen (DE); Johannes Kunze, Mülheim (DE)

(73) Assignee: KROHNE Messtechnik GmbH, Duisburg (DE)

( * ) Notice: Subject to any disclaimer, the term of this patent is extended or adjusted under 35 U.S.C. 154(b) by 0 days.

(21) Appl. No.: 16/582,795

(22) Filed: Sep. 25, 2019

(65) Prior Publication Data

US 2020/0096374 A1 Mar. 26, 2020

(30) Foreign Application Priority Data

Sep. 25, 2018 (DE) .......................... 102018123534.8

(51) Int. Cl.
*G01F 1/84* (2006.01)
(52) U.S. Cl.
CPC .......... *G01F 1/8436* (2013.01); *G01F 1/8431* (2013.01); *G01F 1/8468* (2013.01); *G01F 1/8413* (2013.01); *G01F 1/8422* (2013.01)
(58) Field of Classification Search
None
See application file for complete search history.

(56) References Cited

U.S. PATENT DOCUMENTS

| 6,327,914 | B1 | 12/2001 | Dutton |
| 2002/0033043 | A1 | 3/2002 | Dutton et al. |
| 2005/0022611 | A1 | 2/2005 | Hemp et al. |
| 2005/0081643 | A1* | 4/2005 | Mattar ..................... G01F 1/74 73/861.355 |

(Continued)

FOREIGN PATENT DOCUMENTS

| DE | 102005012505 A1 | 8/2006 |
| DE | 102006017676 B3 | 9/2007 |

(Continued)

*Primary Examiner* — Harshad R Patel
(74) *Attorney, Agent, or Firm* — Whitmyer IP Group LLC (57) ABSTRACT

A method for determining the gas portion in the medium flowing through a Coriolis mass flowmeter, wherein the Coriolis mass flowmeter has at least one measuring tube, at least one oscillation generator, at least two oscillation sensors and at least one control and evaluation unit, wherein the method is characterized in that the density value $\rho_{100}$ of the gas-free medium is determined in a $\rho_{100}$ step, that the density value $\rho_{mess}$ of the medium flowing through the measuring tube is measured in a $\rho_{mess}$ step, that a quantity GVQ for the gas portion of the medium flowing through the measuring tube is calculated in a GVQ step with the density value $\rho_{100}$ and the density value $\rho_{mess}$, and that the quantity GVQ is output for the gas portion of the medium flowing through the measuring tube.

15 Claims, 4 Drawing Sheets

(56) References Cited

U.S. PATENT DOCUMENTS

| | | | |
|---|---|---|---|
| 2005/0138993 A1* | 6/2005 | Mattar | G01F 1/849 |
| | | | 73/61.78 |
| 2005/0193832 A1* | 9/2005 | Tombs | G01F 1/8436 |
| | | | 73/861 |
| 2006/0096388 A1 | 5/2006 | Gysling et al. | |
| 2010/0170322 A1 | 7/2010 | Van Cleve et al. | |
| 2010/0280757 A1 | 11/2010 | Agar et al. | |
| 2012/0118077 A1* | 5/2012 | Henry | G01F 15/024 |
| | | | 73/861.354 |

FOREIGN PATENT DOCUMENTS

| | | |
|---|---|---|
| DE | 102006031198 A1 | 1/2008 |
| DE | 102008039012 A1 | 3/2010 |
| DE | 102013020603 B3 | 4/2015 |
| DE | 102016100952 A1 | 7/2017 |

\* cited by examiner

METHOD FOR DETERMINING THE GAS PORTION IN THE MEDIUM FLOWING THROUGH A CORIOLIS MASS FLOWMETER

TECHNICAL FIELD

The invention relates to a method for determining the gas portion in the medium flowing through a Coriolis mass flowmeter, wherein the Coriolis mass flowmeter comprises at least one measuring tube, at least one oscillation generator, at least two oscillation sensors and at least one control and evaluation unit. In addition, the invention also concerns a Coriolis mass flowmeter that carries out such a method during operation. Coriolis mass flowmeters and methods for operating Coriolis mass flowmeters have been known for many decades in very different designs. High measuring accuracies can be achieved with Coriolis mass flowmeters, some of which are better than 0.1% of the measured value, so that Coriolis mass flowmeters can also be used, for example, in legal metrology.

BACKGROUND

Coriolis mass flowmeters belong to the class of vibration measuring devices. Their function is based on at least one measuring tube through which a medium flows being excited to oscillation by an oscillation generator. This oscillation generator is often an electric drive, which is usually present as an electromagnetic drive. With such an electromagnetic drive, an electric current flows through a coil as an electrical excitation signal, wherein the coil current, in conjunction with the coil, directly exerts a force on the measuring tube. The function of Coriolis mass flowmeters is based on the medium with mass acting on the wall of the measuring tube due to the Coriolis inertial force caused by two orthogonal movements that of the flow and that of the measuring tube. This retroactive effect of the medium on the measuring tube leads to a change in the measuring tube speed in comparison to the oscillation state of the measuring tube without flow. The mass flow through the measuring tube can be determined with high accuracy by recording these special features of the oscillations of the Coriolis measuring tube with flow (phase shift between the oscillation on the inlet and outlet sides of the measuring tube).

The natural frequencies of the oscillating parts of the Coriolis mass flowmeter, i.e. essentially the natural frequencies of the measuring tube as an oscillating element, are of particular importance because the operating points of the Coriolis mass flowmeter are usually set to the natural frequencies of the measuring tube in order to be able to imprint the oscillations required for the induction of the Coriolis forces with a minimum expenditure of energy. The oscillations then carried out by the measuring tube have a certain shape, which is called the eigenform of the respective excitation. Another reason for the special importance of natural frequencies in Coriolis mass flowmeters is the direct physical connection between the natural frequency of the measuring tube in its eigenform and the effectively deflected oscillating mass (measuring tube mass and mass of the medium in the measuring tube). The density of the medium in the measuring tube can be determined via this correlation, which is important for the present invention, even if it is not the primary measured variable of interest of a flowmeter.

If the mass of the oscillating element changes, i.e. the mass of the measuring tube through which the medium flows, then the resonance frequency of the excited or examined oscillation mode also changes. If the measuring tube is excited to oscillate at an unchanged frequency, the excited oscillation is damped due to the shifted resonance point. Various methods for operating a Coriolis mass flowmeter are concerned with detecting a variable resonance frequency and also tracking the frequency of the excitation to the resonance point at a variable resonance frequency; for this, reference is made, for example, to DE 10 2016 100 952 A1 or DE 10 2013 020 603 A1.

A particular challenge for the operation of a Coriolis mass flowmeter is the occurrence of a multi-phase flow with a gaseous portion. Often, only a two-phase flow is mentioned, wherein this term is based on the understanding that this flow has a gaseous phase and a non-gaseous phase, which in turn can have liquid and solid components. The term "two-phase flow" should also be understood in this general sense.

The occurrence of a two-phase flow (i.e. transition from a single-phase flow with only liquid or liquid-solid component to flow with a gas phase) is problematic because gas inclusions can strongly influence the measuring accuracy and also make the safe operation of a Coriolis mass flowmeter difficult or even impossible. The same problems also arise with varying gas portions in the flowing medium. Gas inclusions in the medium can be intentional, for example in applications in the food industry, where processed media can have an airy, whipped consistency.

Irrespective of whether media have gas inclusions intentionally or unintentionally, the measuring accuracy suffers from the circumstance that the entire mass of the flowing medium is no longer fully deflected by the oscillating measuring tube but is only partially deflected. This may, for example, be due to less dense components in the medium flowing around denser components, which also applies to movement components orthogonal to the flow direction, which are essential for Coriolis measurement. The compression or decompression of gaseous components in the medium can also be of importance, which are caused by the mass inertia of heavier liquid or solid components. Depending on the characteristics of the gas inclusions and the shape of the flow regime (stratified, wave-shaped, bubble-shaped, droplet-shaped), gas inclusions can also lead to interruption of the measurement operation because continuous measurement can no longer be guaranteed.

In the past, great efforts have been made to detect two-phase flows and to react to detected two-phase flows using suitable control measures, so that the measurement operation can still continue. Examples are DE 10 2005 012 505 A1, DE 10 2006 031 198 A1 and DE 10 2008 039 012 A1. Various of these measures are part of the applicant's so called "entrained gas management".

DE 10 2006 017 676 A1 is mentioned as an example for the pure detection of a two-phase flow, wherein various state variables and changes in these state variables are evaluated here partly statistically in order to obtain a two-phase signal which indicates the presence or absence of a two-phase flow with great accuracy but does not reliably quantize it.

SUMMARY

Against this background, it is of interest not only to provide a statement during the measurement operation as to whether a two-phase flow is possibly present, but also to obtain a quantitative indication of the gas portion in the medium flowing through the measuring tube of a Coriolis mass flowmeter.

The previously derived object is achieved by various method steps, which are usually implemented in the control and evaluation unit of the Coriolis mass flowmeter. The control and evaluation unit are functionally connected to the organs of the Coriolis mass flowmeter so that the oscillation generator can be controlled, and the signals provided by the oscillation sensors can be recorded. The control and evaluation unit are typically a digital scanning system based, for example, on the use of digital signal processors. Of course, this also includes switching circuits for signal processing, such as analog-to-digital converters, digital-to-analog converters and possibly electronic power components, which, however, are not important in detail in the context of this invention.

It is important that, first, the density value $\rho_{100}$ of the gas-free medium is determined ($\rho_{100}$ step). The knowledge of the density of the medium flowing through the measuring tube when it does not contain any gas components, is of fundamental importance for the calculation of the gas portion in the medium when it does contain gas components. The density value $\rho_{100}$ of the gas-free medium can be given and stored in the control and evaluation unit, it can be theoretically determined and finally, it can be based on a measurement.

In a further step, the density value $\rho_{mess}$ of the medium flowing through the measuring tube is measured ($\rho_{mess}$ step), for example by determining the resonance frequency of the system of measuring tube and medium flowing through it.

In a further process step, the density value $\rho_{100}$ of the gas-free medium and the density value $\rho_{mess}$ of the medium currently flowing through the measuring tube are used to calculate a quantity GVQ for the gas portion of the medium flowing through the measuring tube (GVQ step), so that a meaningful value is available for the gas portion in the medium. This quantity represents a quantitative statement about the gas portion in the medium, it is far more than a pure indicator variable about the presence or absence of gas in the medium flowing through the measuring tube.

Finally, the quantity GVQ for the gas portion of the medium flowing through the measuring tube is output, so that the GVQ value can be used for further calculations also internal to the measuring tube or, for example, is output via a display or externally via a communication terminal (field bus) and can thus be used for process monitoring; this is an exemplary, non-exhaustive enumeration.

According to a further development of the method according to the invention, it is provided that, in an indicator step, an indicator variable $I_{2\text{-}phase}$ is determined for the presence of gas inclusions in the medium flowing through the measuring tube. Such an indicator variable only indicates whether a two-phase flow is present or not. The indicator variable $I_{2\text{-}phase}$ is preferably determined continuously during operation of the Coriolis mass flowmeter. The Coriolis mass flowmeter therefore always has knowledge of the condition of the medium flowing through the measuring tube with regard to the presence of a gaseous phase.

In a further development of the method, the measure described above now makes it possible to carry out the $\rho_{100}$ step by measuring the density of the medium flowing through the measuring tube if the indicator variable $I_{2\text{-}phase}$ indicates that the medium flowing through the measuring tube is free of gas inclusions. The method further developed in this manner thus uses the opportunity to determine the density of the gas-free medium in the presence of a gas-free medium flow. In this manner, it is also possible to react to a varying density of the gas-free medium. Preferably it is provided that the last determined density value $\rho_{100}$ of the gas-free medium is used in the GVQ step, so that the most current density value of the gas-free medium is always used for a calculation of the gas portion.

In a further design of the method, the indicator variable $I_{2\text{-}phase}$ triggers the $\rho_{mess}$ step precisely when the indicator variable $I_{2\text{-}phase}$ indicates that the medium flowing through the measuring tube has gas inclusions. In this case, it is clear that the density determination does not lead to a new density value $\rho_{100}$ of the gas-free medium, but rather to a density value $\rho_{mess}$ of the gaseous medium, on the basis of which a new value for the quantity GVQ for the gas portion of the medium flowing through the measuring tube can be calculated.

In one implementation of the method, the quantity GVQ for the gas portion of the medium flowing through the measuring tube is the gas volume ratio or void ratio (GVR), which corresponds to the quotient of the gas volume and the volume of the non-gaseous medium content and is therefore calculated from the quotient of the difference between $\rho_{100}$ and $\rho_{mess}$ and $\rho_{mess}$ (($\rho_{100}-\rho_{mess}$)/$\rho_{mess}$). In another version of the method, the gas volume fraction or void fraction (GVF) is calculated as the quantity GVQ for the gas portion of the medium flowing through the measuring tube, in which the fraction of the gas volume refers to the total volume examined and is therefore calculated from the quotient of the difference between the density $\rho_{100}$ and the density $\rho_{mess}$ and the density $\rho_{100}$ (($\rho_{100}-\rho_{mess}$)/$\rho_{100}$).

A preferred design of the method provides that, in the GVQ step, the quantity GVQ for the gas portion of the medium flowing through the measuring tube is calculated under the assumption that the density of the gas portion is negligible, in particular zero. The above calculations for the gas to volume ratio and the gas to volume fraction are based on this assumption.

In a further development of the method deviating from this, it is provided that the medium pressure $p_m$ of the medium flowing through the measuring tube is measured and a corrected density value $\rho_{mess}(p_m)$ is determined with the measured medium pressure $p_m$ and the measured density value $\rho_{mess}$ of the medium flowing through the measuring tube, wherein the corrected density value $\rho_{mess}(p_m)$ is then used as the basis for the further method as the measured density value $\rho_{mess}$. The correlation $\rho_{mess}(p_m)$ can be determined experimentally, but it can also be derived from theoretical considerations. The correlation can be stored in the form of a table of values or can also be represented by a mathematical correlation. It does not matter in detail how the correlation is stored $\rho_{mess}(p_m)$, it is important that the correlation is taken into account at all in this design.

It is possible in a further implementation of the method to react to a threshold value for the gas portion of the medium flowing through the measuring tube. This is achieved by comparing the calculated quantity GVQ for the gas portion of the medium flowing through the measuring tube with a limit value $GVQ_{limit}$ for the gas portion of the medium flowing through the measuring tube and by issuing a status message in the event of a specified deviation of the calculated quantity GVQ from the limit value $GVQ_{limit}$. This deviation can be zero or different from zero. The status message can only consist of a bit being set in a register of the control and evaluation unit or a memory cell being written with a corresponding value, the status message can be output in the form of a bus message via a bus interface, the status message can also be displayed via a display of the Coriolis mass flowmeter; there are many other possible ways to output the status signal here. In one design of the above method, a hysteresis is implemented by selecting the specified deviation of the calculated quantity GVQ from the limit value $GVQ_{limit}$ unequal to zero, for example $GVQ_{toleranz}$. If the sum value of the limit value $GVQ_{limit}$ plus the tolerance value $GVQ_{toleranz}$ is exceeded, a status message is output. Conversely, the status message is deleted if the difference between the limit value $GVQ_{limit}$ and the tolerance value $GVQ_{tolerance}$ is not reached.

The object derived in the introduction is achieved by the Coriolis mass flowmeter being discussed here in that the process steps described above are carried out during operation of the Coriolis mass flowmeter. The majority of the steps are performed by the control and evaluation unit. In concrete terms, this means that the control and evaluation unit is designed in such a way that it determines the density value $\rho_{100}$ of the gas-free medium in a $\rho_{100}$ step during operation of the Coriolis mass flowmeter, and measures the density value $\rho_{mess}$ of the medium flowing through the measuring tube in a $\rho_{mess}$ step, a quantity GVQ is calculated for the gas portion of the medium flowing through the measuring tube with the density value $\rho_{100}$ and the density value $\rho_{mess}$ in a GVQ step and the quantity GVQ is output for the gas portion of the medium flowing through the measuring tube.

BRIEF DESCRIPTION OF THE DRAWINGS

In detail, there are now a number of possibilities for designing and further developing the described method for determining the gas portion in the medium flowing through a Coriolis mass flowmeter and the corresponding Coriolis mass flowmeter. This is described using the following figures.

DETAILED DESCRIPTION

FIGS. 1 to 6 show various aspects of a method 1 for determining the gas portion in the medium 3 flowing through a Coriolis mass flowmeter 2. The Coriolis mass flowmeter 2 has two curved measuring tubes 4, an oscillation generator 5, two oscillation sensors 6 and a control and evaluation unit 7. In the view in FIG. 1 only one measuring tube 4 can be seen, the second measuring tube is covered by the first measuring tube 4 in this view. In principle, it is not important in this invention whether the Coriolis mass flowmeter has straight or curved measuring tubes, nor does the number of measuring tubes play any role with regard to the fundamental implementation of the method 1 of interest here.

Figure 1:
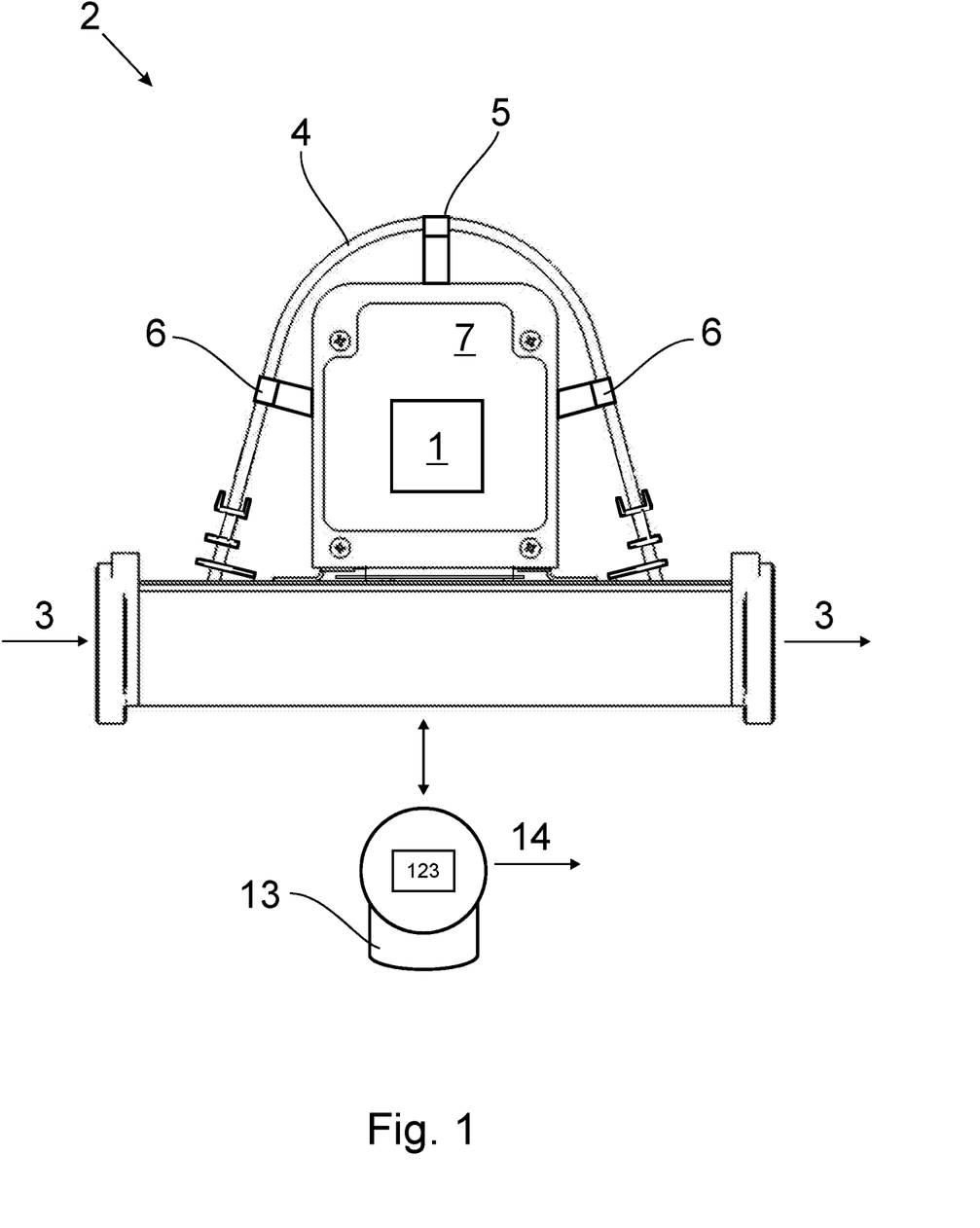
FIG. 1 schematically illustrates a Coriolis mass flowmeter in which a method for determining the gas portion in the medium flowing through its measuring tubes is implemented.

During operation, the measuring tubes 4 with the oscillation generator 5 are excited to a harmonic oscillation in a fundamental oscillation mode. In the presence of a flow of the medium 3 through the measuring tubes 4, opposite Coriolis forces act on the measuring tubes 4 on the inlet and outlet side, whereby a superimposed higher oscillation mode is generated. The phase difference between the superimposed oscillation of the measuring tubes 4 on the inlet and outlet side is a measure of the mass flow through the measuring tubes 4.

As mentioned above, the occurrence of a two-phase flow, i.e. a flow with a gas component and a liquid and/or solid component, is problematic because damping and noise effects impair the measurement. In addition, variable gas portions also cause a change in the density of the medium 3 and, thus, also a change in the resonance frequency of the element capable of oscillation consisting of the measuring tubes 4 and the medium 3 flowing in the measuring tubes 4. Using various control technology measures, it is possible to track the operating point of the Coriolis mass flowmeter 2 by tracking the excitation frequency of the oscillation generator 5 to the variable resonance frequency.

In the embodiment shown in FIG. 1, the control and evaluation unit 7 comprises a digital signal processor and corresponding I/O interfaces for controlling the oscillation generator 5 and for reading the oscillation signals of the oscillation sensors 6. The control technology measures mentioned are implemented on the digital signal processor by means of programming.

It is known in the state of the art to detect the occurrence of a two-phase flow by evaluating state variables of the Coriolis mass flowmeter 2 and to indicate the occurrence with a corresponding indicator variable, whereby such an indicator variable does not contain a reliable quantitative statement about the gas portion in the medium 3, but rather makes a binary statement about whether medium 3 has a gas portion or not.

Figure 2A:
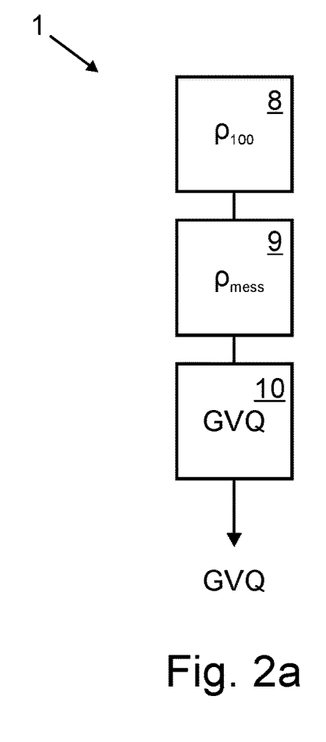
FIG. 2a schematically illustrates a method for determining the gas portion in the medium flowing through the measuring tubes of the Coriolis mass flowmeter.
Figure 2B:
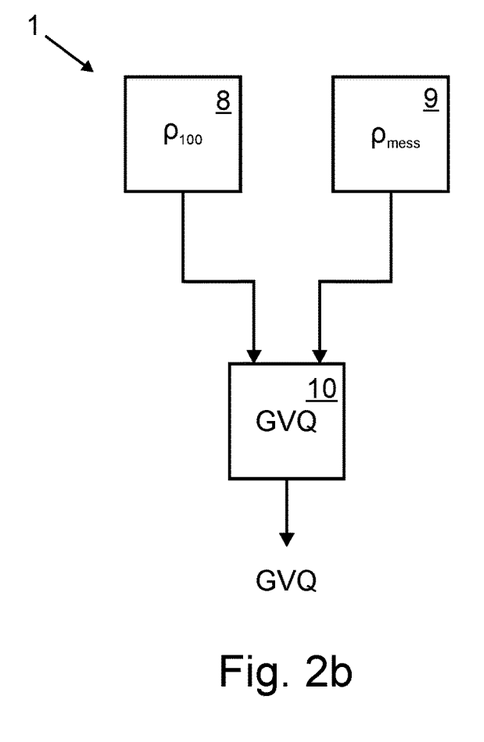
FIG. 2b schematically illustrates a further implementation of the method for determining the gas portion in the medium flowing through a Coriolis mass flowmeter.

FIGS. 2a and 2b show a method 1 with which the gas portion in the medium 3 flowing through the Coriolis mass flowmeter 2 can be determined. For this, it is provided that, in a $\rho_{100}$ step, 8 the density value $\rho_{100}$ of the gas-free medium is first determined. In a $\rho_{mess}$ step 9, the density value $\rho_{mess}$ of the medium 3 flowing through the measuring tubes 4 is measured. The measurement is carried out by determining the resonance frequency of the system. Furthermore, in a GVQ step 10, a quantity GVQ is calculated for the gas portion of the medium 3 flowing through the measuring tubes 4 with the density value $\rho_{100}$ and the density value $\rho_{mess}$. Finally, the quantity GVQ is output for the gas portion of the medium 3 flowing through the measuring tubes 4. The differences in FIGS. 2a and 2b are intended to illustrate that the order in which the $\rho_{100}$ step 8 and the $\rho_{mess}$ step 9 are carried out is irrelevant. Both values, i.e. the density value $\rho_{100}$ and the density value $\rho_{mess}$, are required in order to determine the quantity GVQ for the gas portion in the medium 3.

In the embodiment according to FIG. 2a, the density value $\rho_{100}$ of the gas-free medium is simply given as a fixed value, so the density value $\rho_{100}$ is known in this case. This makes sense if it can be practically ruled out that the density value $\rho_{100}$ of the gas-free medium will change. In other cases, however, the density value $\rho_{100}$ of the gas-free medium can also be determined, for example, by a measurement, which makes sense if it is expected that the density value $\rho_{100}$ of the gas-free medium can also change during operation.

Figure 3:
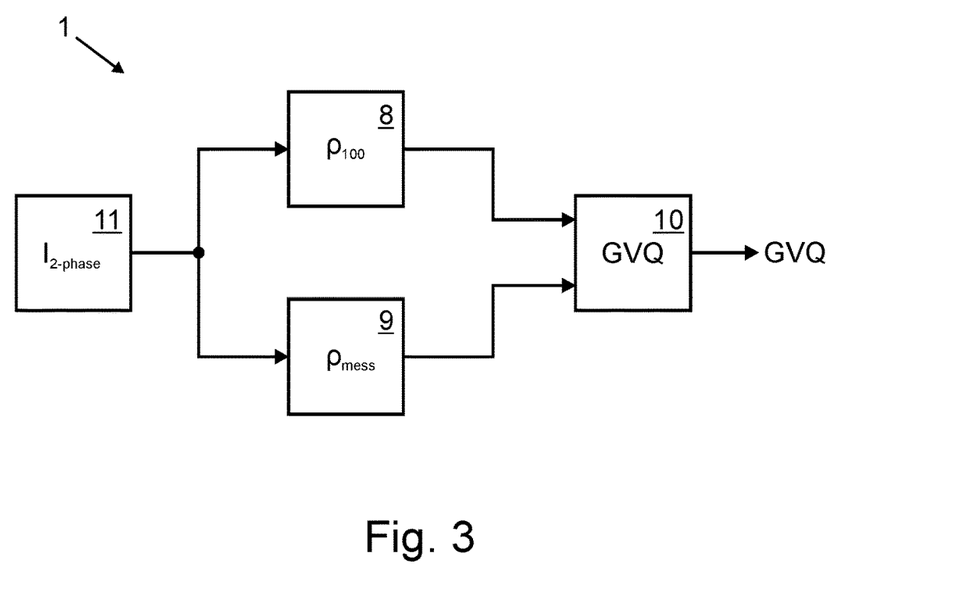
FIG. 3 schematically illustrates the method for determining the gas portion using an indicator variable for a two-phase flow.
Figure 4:
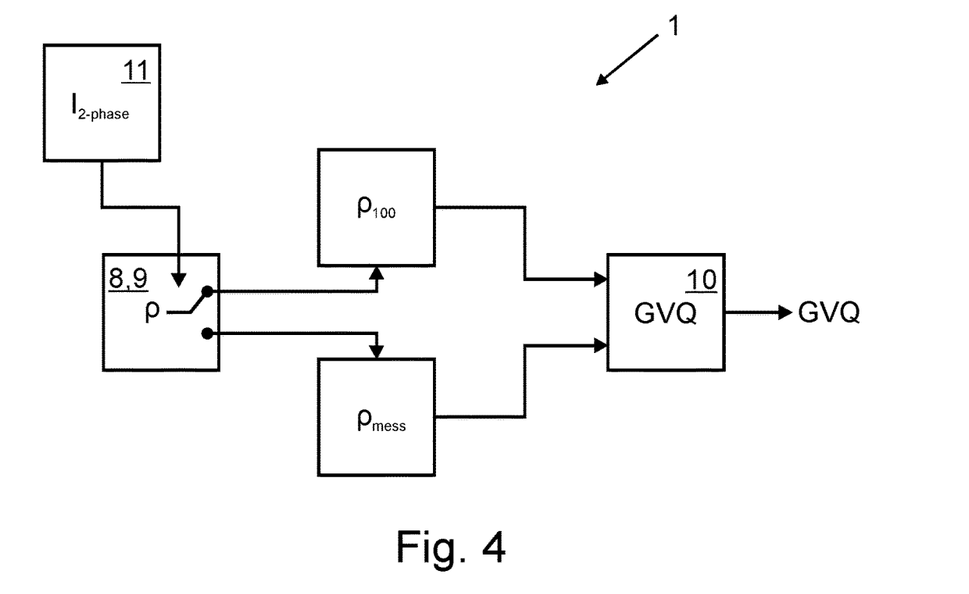
FIG. 4 illustrates a further variation of the method for determining the gas portion using an indicator variable for a two-phase flow.

FIGS. 3 and 4 show that an indicator variable $I_{2\text{-}phase}$ is used for the presence of gas inclusions in the medium flowing through the measuring tubes 4. A common feature of the embodiments is that the indicator variable $I_{2\text{-}phase}$ for the presence of gas inclusions in the medium 3 flowing through the measuring tubes 4 is first determined in an indicator step 11. In the examples shown, this indicator variable $I_{2\text{-}phase}$ is determined continuously during operation of the Coriolis mass flowmeter 2. The indicator variable $I_{2\text{-}phase}$ only provides information about whether a gas phase is present in the medium 3 or not. It is therefore only a binary signal. In any case, the indicator variable $I_{2\text{-}phase}$ for the presence of gas inclusions in the medium 3 flowing through the measuring tubes 4 is determined in an indicator step 11. In the example shown in FIG. 3, the method 1 is designed in such a manner that the $\rho_{100}$ step 8 is carried out by measuring the density $\rho$ of the medium 3 flowing through the measuring tubes 4 only if the indicator variable $I_{2\text{-}phase}$ indicates that the medium 3 flowing through the measuring tubes 4 is free of gas inclusions. The $\rho_{100}$ step 8 is therefore only triggered if the indicator variable $I_{2\text{-}phase}$ indicates this, otherwise the $\rho_{mess}$ step 9 for determining the density value $\rho_{mess}$ is calculated if gas inclusions are present. In the GVQ step 10, the last determined value $\rho_{100}$ of the gas-free medium 3 is always used.

In the embodiment according to FIG. 4, the density value $\rho$ of the medium 3 is determined in a general step 8, 9. It is obvious that this density value $\rho$ is the density value $\rho_{100}$ of the gas-free medium 3 if the indicator variable $I_{2\text{-}phase}$ indicates that the medium 3 has no gas portion. In the event that the medium 3 has a gas portion and this is therefore indicated by the indicator variable $I_{2\text{-}phase}$ the density value $\rho$ corresponds to the density value $\rho_{mess}$ of the medium 3 flowing through the measuring tube 4. In the combined step 8, 9 the density $\rho$ of the medium 3 is therefore always measured in general and stored as density value $\rho_{100}$ or as density value $\rho_{mess}$ depending on the indicator variable $I_{2\text{-}phase}$.

Figure 5:
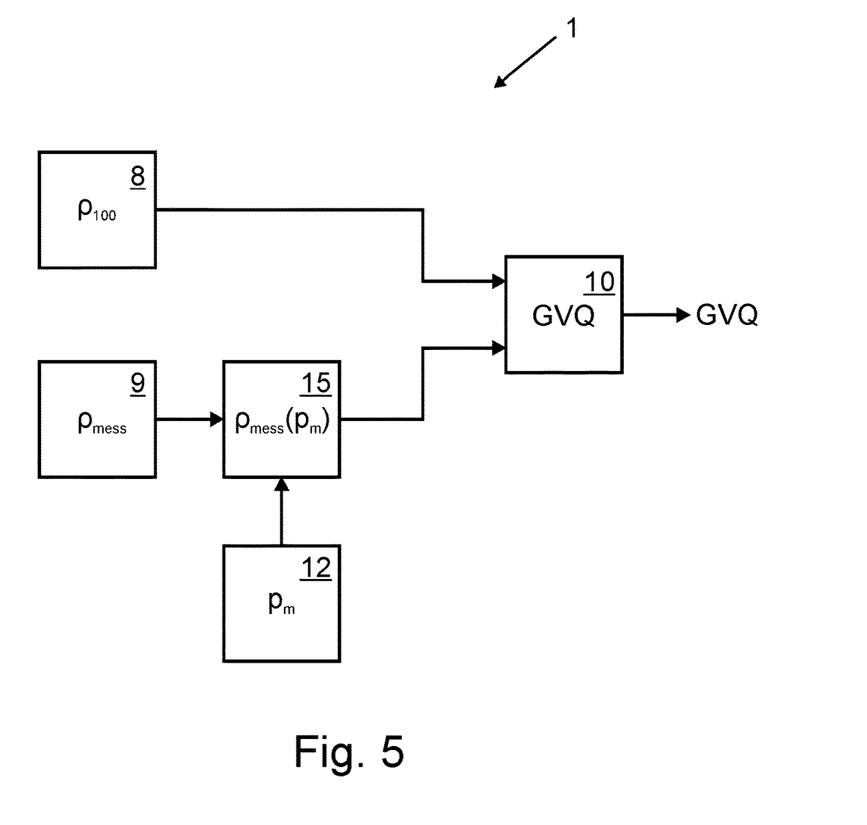
FIG. 5 illustrates a further development of the aforementioned methods using the medium pressure.

The density values shown in FIG. 5 for determining the gas portion in the medium 3 flowing through the Coriolis mass flowmeter 2 is characterized in that the medium pressure $p_m$ of the medium flowing through the measuring tubes 4 is measured 12 and a corrected density value $\rho_{mess}(p_m)$ is determined with the measured medium pressure $p_m$ and the measured density value $\rho_{mess}$ of the medium 3 flowing through the measuring tube 4, wherein the corrected density value $\rho_{mess}(p_m)$ is used as the basis for the further method as the measured density value $\rho_{mess}$, i.e. in particular in the GVQ step 10 for determining the gas portion.

Figure 6:
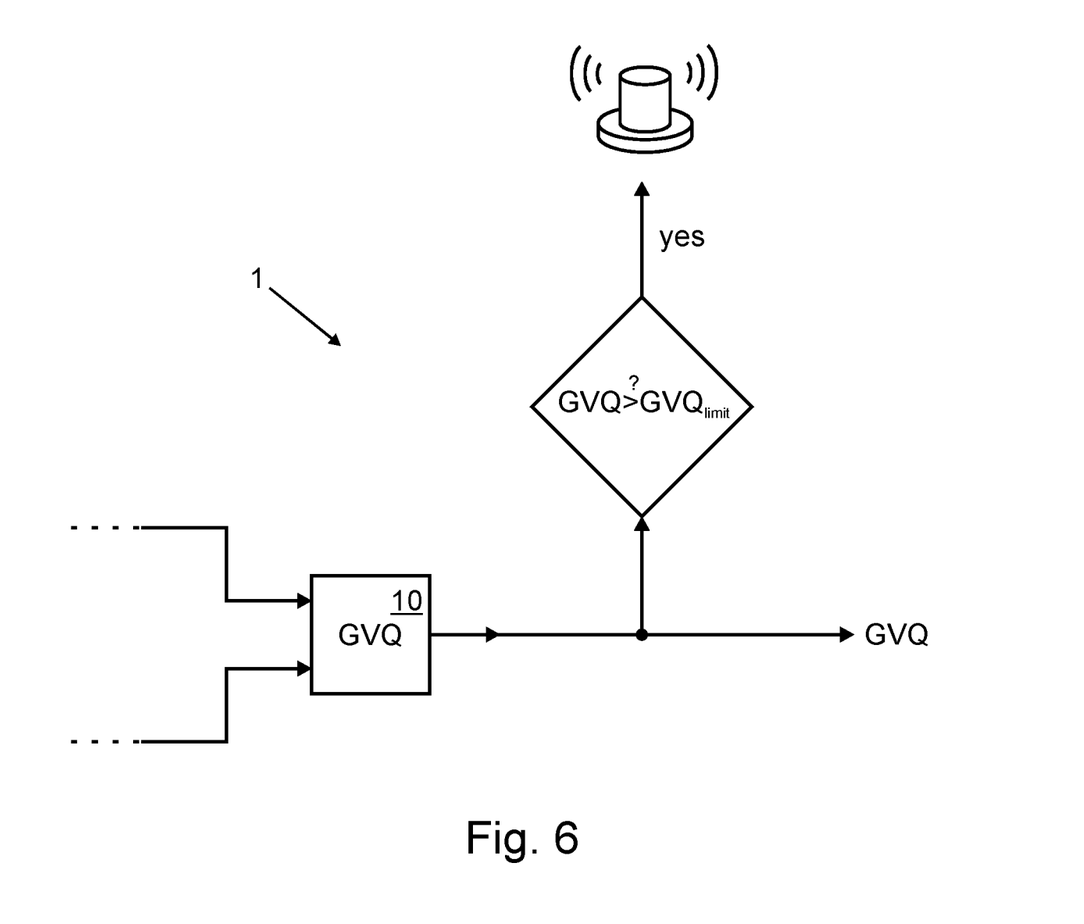
FIG. 6 illustrates an implementation of the method using a threshold value for the quantity GVQ for the gas portion of the medium flowing through the measuring tube.

Finally, FIG. 6 shows that the calculated quantity GVQ for the gas portion of the medium 3 flowing through the measuring tubes 4 is compared with a limit value $GVQ_{limit}$ for the gas portion of the medium 3 flowing through the measuring tube 4 and that a status message is output in the event of a specified deviation of the calculated quantity GVQ from the limit value $GVQ_{limit}$.

FIG. 1 shows schematically that the control and evaluation unit 7 is connected to a display unit 13. The quantity GVQ for the gas portion in the medium 3 can be shown here directly on the display unit 13. However, it is also possible to output the quantity GVQ for the gas portion via a fieldbus interface 14, for example to a higher-level control room. In another configuration, the quantity GVQ is simply output to the control and evaluation unit 7 and stored there. The value for the quantity GVQ can then also be used internally, for example for control or diagnostic purposes.

The invention claimed is:

1. A method for determining the gas portion in the medium flowing through a Coriolis mass flowmeter, wherein the Coriolis mass flowmeter has at least one measuring tube, at least one oscillation generator, at least two oscillation sensors and at least one control and evaluation unit, the method comprising:
    determining a first density value $\rho_{100}$ of the medium by measuring the density of the medium flowing through the at least one measuring tube when an indicator variable $I_{2\text{-}phase}$ for the presence of gas inclusions indicates that the medium flowing through the at least one measuring tube is free of gas inclusions;
    determining a second density value $\rho_{mess}$ of the medium flowing through the at least one measuring tube;
    calculating a quantity GVQ for the gas portion of the medium flowing through the at least one measuring tube with the first density value $\rho_{100}$ and the second density value $\rho_{mess}$; and
    outputting the quantity GVQ for the gas portion of the medium flowing through the at least one measuring tube.

2. The method according to claim 1, further comprising continuously determining the indicator variable $I_{2\text{-}phase}$.

3. The method according to claim 1, wherein the step of determining the second density value $\rho_{mess}$ of the medium flowing through the at least one measuring tube is carried out when the indicator variable $I_{2\text{-}phase}$ indicates that the medium flowing through the at least one measuring tube has gas inclusions.

4. The method according to claim 1, wherein the gas-volume ratio GVR or the gas-volume fraction GVF is calculated as a quantity GVQ for the gas portion of the medium flowing through the at least one measuring tube.

5. The method according to claim 1, wherein the quantity GVQ of the gas portion of the medium flowing through the at least one measuring tube is calculated in the GVQ step under the assumption that the density of the gas portion is zero.

6. The method according to claim 1, wherein the medium pressure $p_m$ of the medium flowing through the at least one measuring tube is measured and a corrected density value $\rho_{mess}(p_m)$ is determined with the measured medium pressure $p_m$ and the measured second density value $\rho_{mess}$ of the medium flowing through the at least one measuring tube, wherein the corrected density value $\rho_{mess}(p_m)$ is used as the measured second density value $\rho_{mess}$.

7. The method according to claim 1, wherein the calculated quantity GVQ for the gas portion of the medium flowing through the at least one measuring tube is compared to a limit value $GVQ_{limit}$ for the gas portion of the medium flowing through the at least one measuring tube and a status message is output in the event of a defined deviation of the calculated quantity GVQ from the limit value $GVQ_{limit}$.

8. The method according to claim 1, wherein the step of calculating the quantity GVQ for the gas portion of the medium flowing through the at least one measuring tube involves use of a last determined first density value $\rho_{100}$ of the medium.

9. A coriolis mass flowmeter, comprising:
    at least one measuring tube through which a medium can flow;
    at least one oscillation generator;
    at least two oscillation sensors; and
    at least one control and evaluation unit;

wherein the at least one control and evaluation unit is designed such that, during operation of the Coriolis mass flowmeter, the at least one control and evaluation unit determines a first density value $\rho_{100}$ of the medium by measuring the density of the medium flowing through the at least one measuring tube when an indicator variable $I_{2\text{-}phase}$ for the presence of gas inclusions indicates that the medium flowing through the at least one measuring tube is free of gas inclusions;

wherein the at least one control and evaluation unit measures a second density value $\rho_{mess}$ of the medium flowing through the measuring tube;

wherein the at least one control and evaluation unit calculates a quantity GVQ for the gas portion of the medium flowing through the measuring tube with the first density value $\rho_{100}$ and the second density value $\rho_{mess}$; and wherein the at least one control and evaluation unit outputs the quantity GVQ for the gas portion of the medium flowing through the measuring tube.

10. The coriolis mass flowmeter according to claim 9, wherein the at least one control and evaluation unit is designed to determine the indicator variable $I_{2\text{-}phase}$.

11. The coriolis mass flowmeter according to claim 9, wherein the at least one control and evaluation unit is designed such that the following process step is carried out:

determining the second density value $\rho_{mess}$ of the medium flowing through the at least one measuring tube when the indicator variable $I_{2\text{-}phase}$ indicates that the medium flowing through the at least one measuring tube has gas inclusions.

12. The coriolis mass flowmeter according to claim 9, wherein the at least one control and evaluation unit is designed such that the following process step is carried out:

calculating the gas-volume ratio GVR or the gas-volume fraction GVF as a quantity GVQ for the gas portion of the medium flowing through the at least one measuring tube.

13. The coriolis mass flowmeter according to claim 9, wherein the at least one control and evaluation unit is designed such that the following process step is carried out:

calculating the quantity GVQ of the gas portion of the medium flowing through the at least one measuring tube under the assumption that the density of the gas portion is zero.

14. The coriolis mass flowmeter according to claim 9, wherein the at least one control and evaluation unit is designed such that the following process step is carried out:

measuring the medium pressure $p_m$ of the medium flowing through the at least one measuring tube and determines a corrected density value $\rho_{mess}(p_m)$ with the measured medium pressure $p_m$ and the measured second density value $\rho_{mess}$, wherein the corrected density value $\rho_{mess}(p_m)$ is used as the measured second density value $\rho_{mess}$.

15. The coriolis mass flowmeter according to claim 9, wherein the at least one control and evaluation unit is designed such that the following process step is carried out:

comparing the calculated quantity GVQ for the gas portion of the medium flowing through the at least one measuring tube to a limit value $GVQ_{limit}$ for the gas portion of the medium flowing through the at least one measuring tube, and outputs a status message in the event of a defined deviation of the calculated quantity GVQ from the limit value $GVQ_{limit}$.

* * * * *